Feb. 7, 1967 M. BEÑO ET AL 3,303,278

TELEVISION PICK-UP CAMERA FOR THREE COLOR PICK-UP OF TELEVISION IMAGES

Filed May 13, 1964

INVENTORS

Miroslav Beňo, Antonín Edelmann, Jan Eigl, Jaroslav Pechar

By Richard Low

Ag't

United States Patent Office
3,303,278
Patented Feb. 7, 1967

3,303,278

TELEVISION PICK-UP CAMERA FOR THREE COLOR PICK-UP OF TELEVISION IMAGES

Miroslav Beňo, Antonín Edelmann, Jan Eigl, and Jaroslav Pechar, Prague, Czechoslovakia, assignors to Tesla, národní podnik, Prague, Czechoslovakia Filed May 13, 1964, Ser. No. 367,072
8 Claims. (Cl. 178—5.4)

This invention relates to an arrangement for positioning television pick-up tubes with respect to an optical dividing system for three colour recording of television pictures in a television camera.

Optical dividing systems used for known pick-up cameras are generally rather complicated and do not permit the use of objectives with short focal lengths. They comprise either three equal pick-up objectives and associated pick-up tubes, mirrors being arranged in front of said pick-up objectives, or a single pick-up objective is used, and an optical dividing system is arranged between this objective and three television pick-up tubes. The system is either of large size, so that the objective must have a rather long back focus, or it is rather complicated and contains in addition to the dividing mirror or prism system three additional objectives and auxiliary lenses, or it requires specially designed small television tubes or static deflection means.

It is an object of this invention to avoid these drawbacks of known color television cameras, and to provide an efficient television pick-up camera of small size.

The essential feature of this invention resides in the special shape of the television pick-up systems which include three conventional television pick-up tubes, for instance vidicons, and which requires only limited space so that conventional pick-up optics of short focal lengths can be used.

Figure 1:
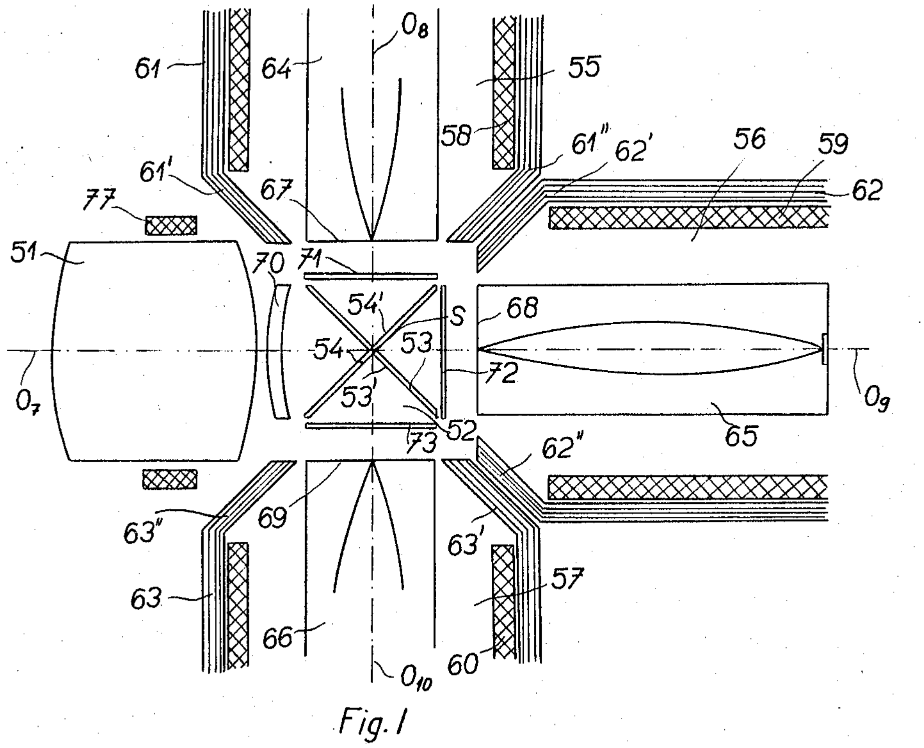
Figure 2:
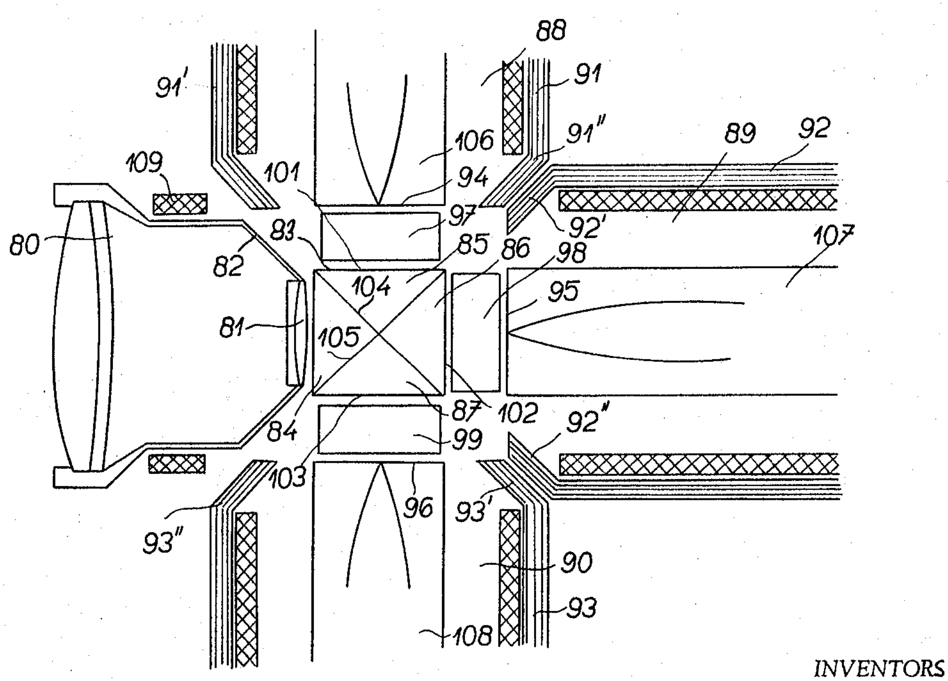

The exact nature of this invention will be more fully understood from the attached drawing in which:

FIG. 1 shows a color television pick-up camera of the invention in a conventional manner, mainly in section on the axes of the optical system; and FIG. 2 illustrates a modification of the camera of FIG. 1 in a corresponding view.

Referring to the drawing in detail, and initially to FIG. 1, there is shown as much of a color television camera as is needed for an understanding of this invention. The camera has an objective lens 51 having a back focus of 30 mm. It is coaxially enveloped by an electromagnetic compensating coil or winding 77. A cylinder lens 70 is interposed on the optical axis $O_7$ of the lens 51 between the objective lens and a beam dividing system 52 consisting of two thin flat glass plates 53, 54 which intersect each other at right angles in a line S perpendicular to the axis $O_7$. The surfaces 53′, 54′ of the plates 53, 54 carry conventional semi-reflecting dichroic coatings or silver coatings and are arranged at angles of 45° to the axis $O_7$ so as to divide a light beam transmitted from the lens 51 along the axis $O_7$ into three partial beams having respective axes $O_8$, $O_9$, and $O_{10}$ offset from each other and from the axis $O_7$ at right angles in a common plane, the arrangement being such that the axis $O_9$ coincides with the axis $O_7$, and the axes $O_8$ and $O_{10}$ coincide with each other.

Three recording systems 55, 56, 57 are respectively aligned with the axes $O_8$–$O_{10}$ and are substantially identical in dimensions and shapes. They include respective pick-up tubes 64, 65, 66, such as vidicons, whose light sensitive screens have surfaces 67, 68, 69 arranged perpendicularly to the associated optical axes $O_8$ to $O_{10}$ at equal distances from the central line S of the beam dividing system 52. Color filters 71, 72, 73 are interposed between the system 52 and the surfaces 67, 68, 69.

The recording systems further include conductive coils 58, 59, 60 coaxially enveloping the tubes 64, 65, 66 for magnetic deflection and focussing of an electron beam in a conventional manner. The coils are contained in tubular casings 61, 62, 63 of magnetically conductive material which form the respective magnetic circuits of the coils. The axial end portion of each casing tapers toward the beam dividing system 52 in such a manner that the opposite walls 61′, 61″, 62′, 62″, 63′, 63″ of the end portions are offset 45° from the associated optical axes $O_8$, $O_9$, $O_{10}$ in the common plane of the axes, and at least one of the walls is contiguously adjacent a corresponding wall of another casing. The light sensitive surfaces of the tubes 64, 65, 66 are located substantially in the planes defined by the free edges of the associated axially terminal casing portions, and are thus closely adjacent the beam dividing system 52. Dimensional relationships are evident from the drawing and the fact that the beam dividing system has dimensions of 30 mm. x 30 mm. The walls of the end portions 61, 62, 63 may actually be joined to each other. They may be conical or pyramidal.

The manner in which partial images corresponding to three colors in the object viewed by the objective 52 are recorded by the systems 55 to 57 is evident from the preceding description of FIG. 1. Astigmatism in the partial images which may be produced by the mirrors 53, 54 is corrected by the cylindrical lens 70. Difficulties due to electrical or magnetic interaction of the several closely juxtaposed tubes 64, 65, 66 can be compensated for by the coil 77.

The camera illustrated in FIG. 2 has an objective lens system mounted in a barrel 82 which accommodates a front element 80 and a rear element 81. The innermost portion of the barrel 82 tapers conically, and the rear element 81 projects slightly outward of the barrel in an axial direction so that the air gap betwen the last glass surface of the objective and the associated beam dividing system is only 0.5 millimeter.

The beam dividing system 83 is a cube assembled from four prisms 84, 85, 86, 87 whose cemented interfaces 104, 105 extend at right angles to each other and intersect in a line perpendicular to the axis of the objective lens system. The interfaces are coated as described with reference to FIG. 1 to make them semi-reflecting. A beam entering the dividing system 83 from the lenses 80, 81 is divided into three beams which leave the system 83 through surfaces 101, 102, 103 in three directions offset at right angles in a manner analogous to the system 52 in FIG. 1.

Color filters 97, 98, 99 are respectively cemented to the planar surfaces 101, 102, 103. They transmit the partial beams to three recording systems 88, 89, 90, more specifically, to the light sensitive surfaces 94, 95, 96 of three television pick-up tubes 106, 107, 108. The tubes are equipped with coaxial coils and tubular casings 91, 92, 93 of magnetic material, the axial ends of the casings tapering conically or pyramidally so that their opposite walls 91′, 91″; 92′, 92″; 93′, 93″ converge at angles of 45° to the axes of the corresponding recording systems.

The tapering portions of juxtaposed casings are very close to each other or actually touch each other, and are close to the conical portion of the lens barrel 82. They may touch the barrel when the objective lens system is focused on a distant object.

Many variations in the illustrated devices of the invention will readily suggest themselves to those skilled in the art. The application of the instant teachings to other optical systems of small size in which the reflecting surfaces of the beam dividing system do not intersect each other at angles of 90° in the shape of a cross is obvious. The conical or pyramidal ends of the magnetic casings may be arranged closely adjacent each other at other angles.

We claim:

1. A color television camera comprising, in combination:

(a) objective lens means having an optical axis;

(b) beam dividing means for dividing a light beam axially transmitted by said lens means into three partial light beams having respective axes angularly offset from each other;

(c) three television pick-up tubes having respective light sensitive surfaces respectively intersecting the axes of said partial light beams;

(d) a magnetic coil extending about the axis of each partial beam and substantially enveloping the associated tube; and (e) a tubular casing of magnetic material associated with each coil and extending about said axis, each casing having an axial end portion near said beam dividing means, opposite walls of said end portion converging in an axial direction toward said beam dividing means, at least one of said walls of each casing being contiguously adjacent a corresponding wall of another casing.

2. A camera as set forth in claim 1, wherein said axes are offset from each other in a common plane substantially at right angles, the axes of said lens means and of one of said partial light beams substantially coinciding, and the axes of the two other partial light beams substantially coinciding and being offset 90° from the axis of said objective lens means.

3. A camera as set forth in claim 2, wherein each of said axial end portions has an axially terminal edge defining a plane transverse of the axis of the corresponding partial light beam, said surface being substantially located in said plane.

4. A camera as set forth in claim 2, further comprising a compensating coil extending about the axis of said objective lens means and enveloping said lens means.

5. A camera as set forth in claim 2, wherein said beam dividing means include a plurality of prisms having respective planar surfaces facing said tubes, the camera further comprising a color filter cemented to each of said planar surfaces.

6. A camera as set forth in claim 2, further comprising a color filter intersecting the axis of each partial light beam between said beam dividing means and the light sensitive surface of the associated pick-up tube.

7. A television pick-up camera for three color pick-up of television images comprising an optical dividing system adapted to partially reflect and partially to allow to pass a light beam, and adapted to divide said light beam into three partial light beams in relatively perpendicular directions, television pick-up tubes with light sensitive pick-up screens arranged in three relatively perpendicular planes adapted to record the images created by said three partial light beams, said television pick-up tubes being provided with magnetic coils surrounding said tubes in order to deflect and to focus an electron beam, said magnetic coils being provided with circumferential casings of magnetically conductive material, the ends of said casings facing the pick-up screens being tapered in a conical or pyramid shape, the tapered ends of said casings being in juxtaposed position so as to define a limited space occupied by said optical dividing system, an objective lens in front of said optical dividing system, magnetic means surrounding said objective lens and adapted to compensate interaction between said pick-up tubes.

8. A television pick-up camera for three color pick-up of television images comprising an optical dividing system adapted to partially reflect and partially to allow to pass a light beam, and adapted to divide said light beam into three partial light beams in relatively perpendicular directions, television pick-up tubes with light sensitive pick-up screens arranged in three relatively perpendicular planes adapted to record the images created by said three partial light beams, said television pick-up tubes being provided with magnetic coils surrounding said tubes in order to deflect and to focus an electron beam, said magnetic coils being provided with circumferential casings of magnetically conductive material, the ends of said casings facing the pick-up screens being tapered in a conical or pyramid shape, the tapered ends of said casings being in juxtaposed position so as to define a limited space occupied by said optical dividing system, an objective lens in front of said optical dividing system, electric means surrounding said objective lens and adapted to compensate interaction between said pick-up tubes.

References Cited by the Examiner

UNITED STATES PATENTS

| | | | |
|---|---|---|---|
| 2,632,370 | 3/1953 | Shepard | 178—7.92 X |
| 2,740,918 | 4/1956 | James et al. | 313—313 |
| 2,797,408 | 6/1957 | Greatbatck et al. | 178—7.82 |
| 2,803,770 | 8/1957 | Harkensee | 313—313 |

DAVID G. REDINBAUGH, *Primary Examiner.*

J. A. O'BRIEN, *Assistant Examiner.*